United States Patent [19]

Gebler

[11] 4,324,862

[45] Apr. 13, 1982

[54] BASIC (MGO) NON-AQUEOUS PLASTIC REFRACTORY MIXTURE

[75] Inventor: Kenneth A. Gebler, Munster, Ind.

[73] Assignee: Nalco Chemical Company, Oak Brook, Ill.

[21] Appl. No.: 234,082

[22] Filed: Feb. 13, 1981

[51] Int. Cl.³ .............................................. C04B 35/04
[52] U.S. Cl. .................................. 501/109; 501/110; 501/111; 501/118
[58] Field of Search ................... 106/58, 62; 501/108, 501/109, 110, 111, 118

[56] References Cited

U.S. PATENT DOCUMENTS

| | | | |
|---|---|---|---|
| 3,241,987 | 3/1966 | Dreyling et al. | 106/58 |
| 3,316,108 | 4/1967 | Blomberg | 106/58 |
| 3,340,075 | 9/1967 | Stoddard et al. | 106/58 |
| 3,652,305 | 3/1972 | Cook | 106/62 |
| 3,729,329 | 4/1973 | Morris et al. | 106/58 |

*Primary Examiner*—James Poer
*Attorney, Agent, or Firm*—John G. Premo; Robert A. Miller

[57] ABSTRACT

Substantially non-aqueous, plastic, high magnesium oxide refractory compositions are disclosed. The materials remain fluid over prolonged storage times, providing for easy workability and require no addition of water prior to use.

3 Claims, No Drawings

BASIC (MGO) NON-AQUEOUS PLASTIC REFRACTORY MIXTURE

Refractory ceramic products containing high levels of magnesium oxide are used in the iron and steel industry where resistance to high temperatures, molten metals, and molten basic slags are necessary. Current products are made generally as dry mixes and must be kept dry because powdered magnesium oxide in these types of products readily hydrates when mixed or contacted with water which is needed to prepare a working consistency. Stiffening occurs as the hydration progresses and a wet mixture of magnesium oxide is generally workable only for a short time, approximately 0-3 hours.

U.S. Pat. No. 3,729,329 attempts to prepare an essentially non-aqueous magnesium oxide refractory material. To keep the material fluidized, lubricating oil is utilized. Materials prepared according to this patent accordingly are expensive due to the motor oils utilized.

It is believed that no satisfactory fluidized magnesium oxide refractory material is available which can avoid the above difficulties. Accordingly, this invention is directed to a substantially non-aqueous plastic refractory mixture which has excellent long-term shelf life and which does not stiffen and become unusable as do products which are currently available. The invention described herein is directed to a fluidized substantially non-aqueous, plastic, high magnesium oxide refractory mixture. This mixture can be utilized as is in its fluidized state and does not stiffen and become unworkable as do prior art materials.

THE INVENTION

The high magnesium oxide containing refractory materials of this invention generally comprise:
(a) 50-90% magnesium oxide
(b) 6-44% by weight refractory filler
(c) 3-12% by weight of a water miscible glycol
(d) 1-8% by weight molasses

The Magnesium Oxides

The magnesium oxides utilized in this invention may be any of those commercially available and commonly used currently in refractory operations. This list includes dead-burned dolomite, dead-burned magnesite and/or mixtures of the above. Other forms of magnesium oxide can be used. In addition, hard-burned lime or chrome ores can be used in combination and as part of the filler of the above materials.

Particle sizes of the magnesium oxide materials utilized in this invention can vary over wide ranges, depending upon the application to which the mixture is to be employed. Particle sizes range from as high as ½ inch to as low as −100 mesh can generally be employed, depending upon the application.

The magnesium oxide material will generally be utilized at a level of from 50-90% by weight of the composition and more preferably, 60-90% by weight. High levels of magnesium oxide are generally preferred in the formulation of the compounds described herein.

The Refractory Fillers

The refractory fillers utilized in this invention can vary considerably in chemical consistuency. Clays, refractory aluminas, lime, chromes, boron compounds, phosphates, etc. can be utilized as the fillers employed in this invention depending upon the types of mixture to be utilized and the purpose for which the mixture is intended. Fillers are generally employed at levels of 6-44% and most preferably, from 7-30% by weight of the mixture. Fillers commonly employed include chrome ores, clays, aluminas, borates such as Borax, and small percentages of phosphates such as sodium pyrophosphate.

The Water Miscible Glycol

The water miscible organic glycol utilized in this invention is substantially anhydrous when employed and may be selected from the group consisting of ethylene glycol, diethylene glycol, propylene glycol and dipropylene glycol. Glycol materials having longer alkyl groups can also be employed in this invention so long as they are untimately water-soluble. The glycol materials are generally utilized at a level of from 3-12% by weight of the composition of this invention. Preferably, from 4-10% by weight of the glycol is utilized.

The Molasses

Molasses is generally utilized at a level of from 1-8% by weight of the composition of this invention. The molasses employed is a natural by-product from cane sugar manufacture and, may contain up to 20% by weight water. Molasses materials containing an excess of 20% water should be avoided due to possible hydration of the magnesium oxide component of this invention with resultant reduced storage life. Preferably from 2-6% by weight molasses is utilized in the compositions of this invention.

The Formulation of the Components of This Invention

The ingredients described above are prepared by simple blending techniques known to those in the industry. Generally, no sophisticated equipment is required. However, contact with excess water and/or high humidities should be avoided.

The resultant compositions after blending are in a plastic form and are fluid enough to be worked. Materials may be used as is, with heat curing allowing the mixture to solidify. Mixtures such as those described above, will generally have service lives in steel mill application as long as or longer than equivalent magnesium oxide refractory products prepared utilizing conventional aqueous systems.

EXAMPLES

Six compositions were formulated as shown in Table I. Refractory cylinders were prepared from all six products by ramming in a cylindrical mold. These materials were then allowed to dry. Stiffness of all materials was satisfactory. Shelf life of the materials (1-6) at 110° F. showed no deterioration after one week at this specified temperature. Strength tests were run on the mixtures listed in Table I at 250° F. drying temperature, 750° F., 1500° F. and 2950° F. At the first three temperatures, all mixes proved satisfactory. At 2950° F. Example 1 showed fair strength, 2 was strong with Examples 3, 4, 5 and 6 being weak. Little shrinkage or expansion of the prepared cylinders was noted after firing. A material formulated identical to Example 1 above was trialed at a steel mill located in the northeastern section of the United States.

After curing, the refractory installation withstood 15 heats of hot metal. While this level was lower than the goal of 35 heats or more, and reasons for the lowered life of the product have not been established, it is suspected that the refractory material utilized contained too little magnesium oxide. It is suspected that magnesium oxide refractory products prepared according to this invention and containing from 80–90% magnesium oxide will be successful in this application.

TABLE I

|  | Examples | | | | | |
|---|---|---|---|---|---|---|
|  | 1 | 2 | 3 | 4 | 5 | 6 |
| ⅜" dead-burned MgO | 4.72 | 4.95 | — | — | — | — |
| −100 M dead-burned MgO | 15.10 | 15.84 | — | — | — | — |
| −10 M calcined MgO | 38.67 | 40.59 | 56.60 | 57.97 | 60.1 | 60.66 |
| chrome ore | — | — | 25.47 | 26.10 | — | — |
| high alumina clay | 5.66 | 5.94 | 5.18 | 5.31 | 1.73 | 1.75 |
| $Na_4P_2O_7$ | 4.72 | — | 0.94 | — | 0.98 | 0.99 |
| borax | 0.94 | 0.99 | 0.94 | 0.97 | 0.98 | 0.99 |
| 14 M $Al_2O_3$ | 18.86 | 19.80 | — | — | 21.66 | 21.87 |
| $Cr_2O_3$ | — | — | — | — | 5.22 | 5.27 |
| molasses | 4.72 | 4.95 | 4.72 | 4.83 | 4.92 | 4.97 |
| diethylene glycol | 6.60 | 6.93 | 6.13 | 4.83 | 4.43 | 4.47 |

Having thus described my invention, I claim:

1. A substantially non-aqueous magnesium oxide refractory composition comprising:
   (a) 50–90% particulate magnesium oxide
   (b) 6–44% by weight refractory filler
   (c) 3–12% by weight of a water miscible glycol
   (d) 1–8% by weight molasses.
2. The composition of claim 1 wherein the percentages of the ingredients are:
   (a) 60–90% particulate magnesium oxide
   (b) 7–30% by weight refractory filler
   (c) 4–10% by weight of a water miscible glycol
   (d) 2–6% by weight molasses.
3. A substantially non-aqueous magnesium oxide refractory composition comprising:
   (a) 4.72% ⅜" dead-burned MgO
   (b) 15.10% −100 M dead-burned MgO
   (c) 38.67% −10 M calcined MgO
   (d) 5.66% high alumina clay
   (e) 4.72% $Na_4P_2O_7$
   (f) 0.94% borax
   (g) 18.86% 14 M $Al_2O_3$
   (h) 4.72% molasses
   (i) 6.60% diethylene glycol

* * * * *